(12) United States Patent
Kondou et al.

(10) Patent No.: US 11,255,660 B2
(45) Date of Patent: Feb. 22, 2022

(54) OPTICAL SENSOR AND ROTATING MACHINE

(71) Applicant: MITSUBISHI HEAVY INDUSTRIES, LTD., Tokyo (JP)

(72) Inventors: Akio Kondou, Tokyo (JP); Tomoyuki Onishi, Tokyo (JP); Takahiro Miyamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 763 days.

(21) Appl. No.: 16/088,656

(22) PCT Filed: Jan. 18, 2017

(86) PCT No.: PCT/JP2017/001575
§ 371 (c)(1),
(2) Date: Sep. 26, 2018

(87) PCT Pub. No.: WO2017/168970
PCT Pub. Date: Oct. 5, 2017

(65) Prior Publication Data
US 2020/0300609 A1 Sep. 24, 2020

(30) Foreign Application Priority Data
Mar. 30, 2016 (JP) .............................. JP2016-067343

(51) Int. Cl.
| | |
|---|---|
| *G01B 11/14* | (2006.01) |
| *H02K 11/22* | (2016.01) |
| *F01D 25/24* | (2006.01) |
| *F02C 7/00* | (2006.01) |
| *G01B 11/02* | (2006.01) |

(52) U.S. Cl.
CPC .............. *G01B 11/14* (2013.01); *F01D 25/24* (2013.01); *F02C 7/00* (2013.01); *G01B 11/026* (2013.01); *H02K 11/22* (2016.01)

(58) Field of Classification Search
CPC ..... G01B 11/026; G01B 11/002; G01B 11/14; G01S 5/163; G01S 5/16
(Continued)

(56) References Cited

U.S. PATENT DOCUMENTS

| | | | |
|---|---|---|---|
| 4,766,323 | A | 8/1988 | Franklin et al. |
| 8,970,228 | B2 | 3/2015 | Andarawis et al. |

(Continued)

FOREIGN PATENT DOCUMENTS

| | | |
|---|---|---|
| CN | 1506654 A | 6/2004 |
| CN | 1285881 C | 11/2006 |

(Continued)

OTHER PUBLICATIONS

Office Action dated May 4, 2021, issued in counterpart DE Application No. 112017001659.2, with English Translation. (12 pages).
(Continued)

*Primary Examiner* — Md M Rahman
(74) *Attorney, Agent, or Firm* — Westerman, Hattori, Daniels & Adrian, LLP

(57) ABSTRACT

This optical sensor includes an illuminating optical fiber, a first light receiving optical fiber, a second light receiving optical fiber, and a measuring unit. An intersection of a reflected light entering the first light receiving optical fiber and the reflected light entering the second light receiving optical fiber is located on a front end surface of a sensor head or is closer to the peripheral surface of a moving body (a rotating body) than the front end surface of the sensor head is. This can compensate for effects of thermal expansion and accurately measure a clearance.

11 Claims, 8 Drawing Sheets

(58) Field of Classification Search
USPC .......................................................... 356/614
See application file for complete search history.

(56) References Cited

U.S. PATENT DOCUMENTS

| | | | |
|---|---|---|---|
| 2004/0114154 A1* | 6/2004 | Luetche | G01S 17/48 356/615 |
| 2010/0191502 A1 | 7/2010 | Ren et al. | |
| 2012/0182563 A1 | 7/2012 | Kominsky | |
| 2015/0276931 A1 | 10/2015 | Airoldi et al. | |
| 2015/0285613 A1 | 10/2015 | Kilpatrick et al. | |

FOREIGN PATENT DOCUMENTS

| | | |
|---|---|---|
| CN | 203100688 U | 7/2013 |
| CN | 104501728 A | 4/2015 |
| CN | 104949625 A | 9/2015 |
| EP | 1429155 A1 | 6/2004 |
| EP | 2213844 A2 | 8/2010 |
| JP | 2004-191374 A | 7/2004 |
| JP | 2014-40795 A | 3/2014 |
| JP | 2015-001414 A | 1/2015 |
| WO | 2012/097284 A1 | 7/2012 |

OTHER PUBLICATIONS

Office Action dated Nov. 20, 2019, issued in counterpart CN application No. 201780020511.1, with English translation. (14 pages).
International Search Report and Written Opinion dated Mar. 21, 2017, issued in counterpart Japanese Application No. PCT/JP2017/001575, with English translation. (16 pages).

* cited by examiner

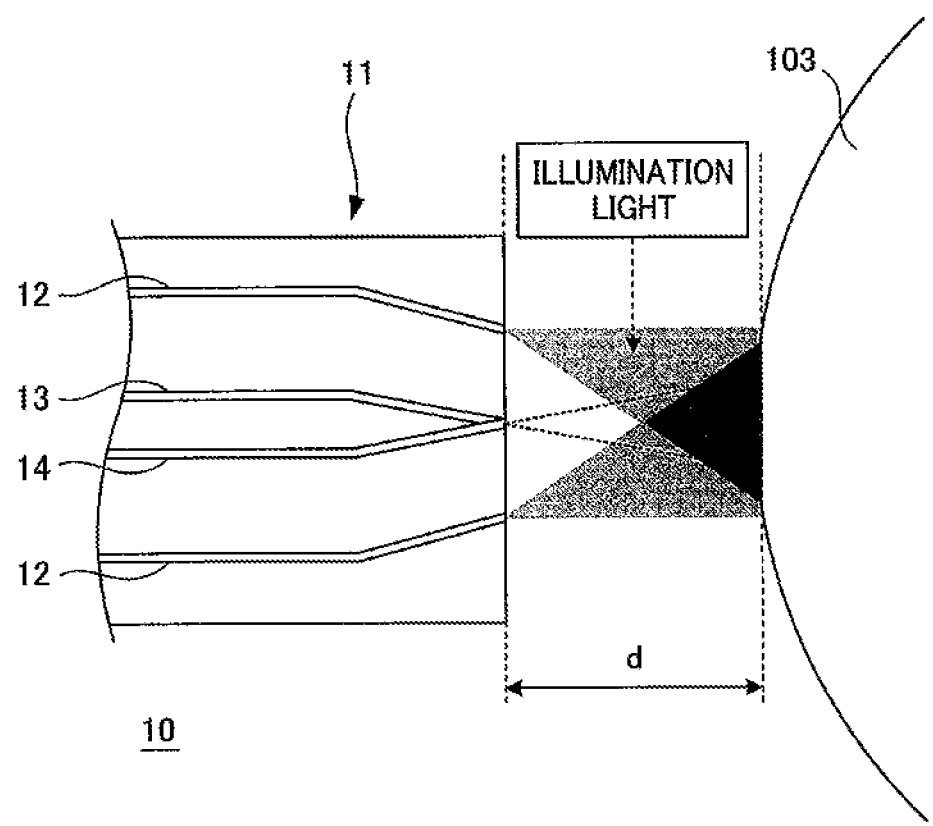

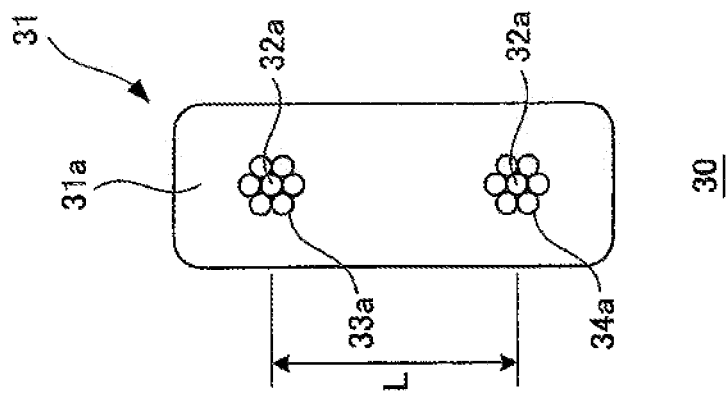
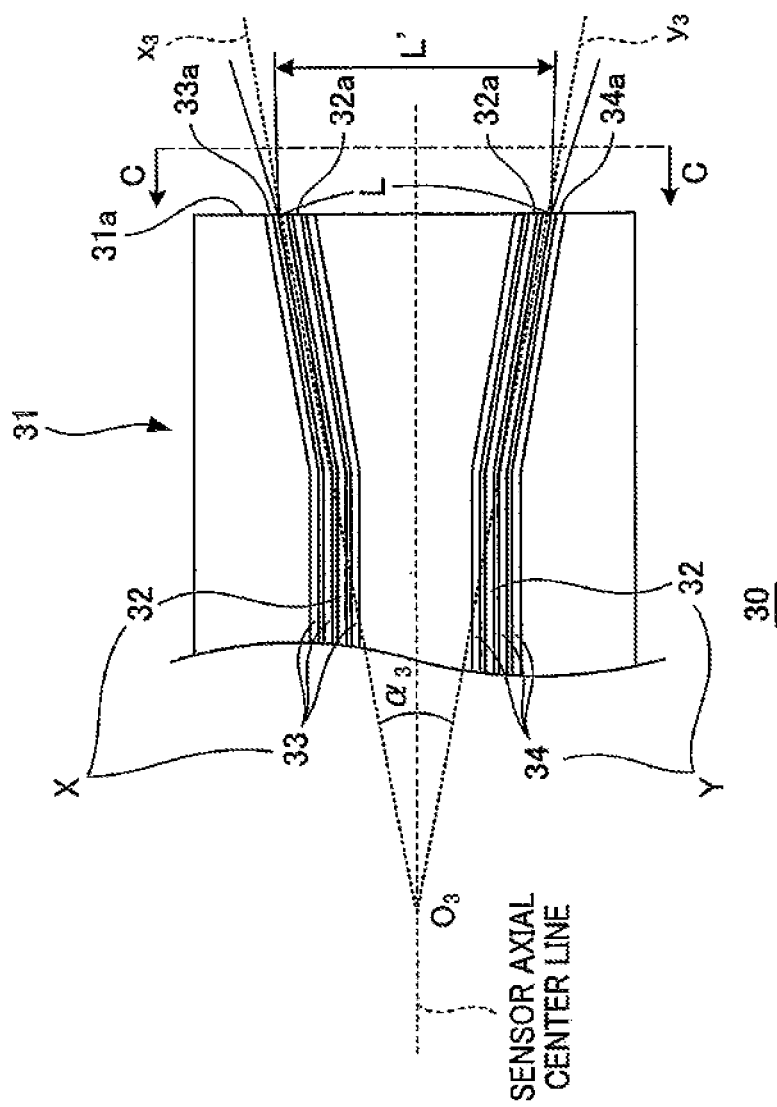

OPTICAL SENSOR AND ROTATING MACHINE

TECHNICAL FIELD

The present invention relates to an optical sensor and a rotating machine including the optical sensor.

BACKGROUND ART

For example, in order to improve performance of a turbine machine, a tip clearance needs to be reduced as described in Patent Literature 1 listed below. The tip clearance thus needs to be accurately measured. Moreover, a clearance between the rotary side and the stationary side needs to be accurately measured in rotating machines in general.

PRIOR ART DOCUMENT

Patent Document

Patent Document 1: Japanese Patent Application Publication No. 2014-40795

SUMMARY OF THE INVENTION

Problems to be Solved by the Invention

However, measurement of the clearance in a high-temperature high-pressure water vapor environment has many problems to be solved. For example, in the vapor environment, an electrostatic capacitance clearance sensor cannot be used because it may experience insulation failure due to deterioration and is affected by changes in dielectric constant.

Meanwhile, an optical fiber clearance sensor (optical sensor) does not suffer from such influences in the high-temperature high-pressure water vapor environment as described above and is suitable for use. However, in the conventional technique, the optical sensor can detect a qualitative change but cannot measure a quantitative change.

One of the reasons why the optical sensor cannot perform quantitative measurement is occurrence of thermal expansion in the optical sensor itself. Optical fibers in a front end portion of the optical sensor are fixed at specified intervals (distances between the optical fibers (groups)) and angles. However, occurrence of thermal expansion in the optical sensor in various directions changes these intervals and angles. Such shape changes cause variation in a measurement value of the clearance.

Accordingly, in view of the technical problems described above, an object of the present invention is to provide an optical sensor and a rotating machine which can compensate for effects of thermal expansion and accurately measure a clearance.

Means for Solving the Problems

An optical sensor according to a first aspect of the invention to solve the above problem is characterized in that a front end surface of a sensor head faces a moving body to be measured while being arranged parallel to a moving direction of the moving body,
the optical sensor includes:
an illuminating optical fiber which emits illumination light from a light emitting unit, from an end surface thereof exposed on the front end surface of the sensor head toward a peripheral surface of the moving body;
a first light receiving optical fiber which receives reflected light, being the illumination light reflected on the peripheral surface of the moving body, at an end surface thereof exposed on the front end surface of the sensor head and inputs the reflected light into a first light receiving unit;
a second light receiving optical fiber which receives the reflected light at an end surface thereof exposed on the front end surface of the sensor head and inputs the reflected light into a second light receiving unit; and
a measuring unit which measures a clearance to the moving body based on a timing at which the reflected light is inputted into each of the first light receiving unit and the second light receiving unit,
an intersection of the reflected light entering the first light receiving optical fiber and the reflected light entering the second light receiving optical fiber in the moving direction of the moving body is located on the front end surface of the sensor head or is closer to the peripheral surface of the moving body than the front end surface of the sensor head is.

An optical sensor according to a second aspect of the invention to solve the above problem is the optical sensor according to the first aspect of the invention, characterized in that the end surface of the first light receiving optical fiber and the end surface of the second light receiving optical fiber are arranged to be tilted symmetrically with respect to a sensor axial center line with a separation distance between the end surfaces on the front end surface of the sensor head being zero in the moving direction of the moving body.

An optical sensor according to a third aspect of the invention to solve the above problem is the optical sensor according to the second aspect of the invention, characterized in that the end surface of the illuminating optical fiber is arranged separately from the end surface of the first light receiving optical fiber and the end surface of the second light receiving optical fiber on the front end surface of the sensor head.

An optical sensor according to a fourth aspect of the invention to solve the above problem is the optical sensor according to the third aspect of the invention, characterized in that the end surface of the illuminating optical fiber is radially arranged around the end surface of the first light receiving optical fiber and the end surface of the second light receiving optical fiber on the front end surface of the sensor head.

An optical sensor according to a fifth aspect of the invention to solve the above problem is the optical sensor according to the first aspect of the invention, characterized in that
the end surface of the illuminating optical fiber, the end surface of the first light receiving optical fiber, and the end surface of the second light receiving optical fiber are separate from one another on the front end surface of the sensor head,
a block whose shape change due to heat is isotropic deformation and which has a front end surface facing the moving body while being arranged parallel to the moving direction of the moving body is provided on the front end surface of the sensor head,
in the block, there are formed an illumination hole which is a through hole connected to the end surface of the illuminating optical fiber, a first light receiving hole which is a through hole connected to the end surface of the first light receiving optical fiber, and a second light receiving hole which is a through hole connected to the end surface of the second light receiving optical fiber, and the first light receiving hole and the second light receiving hole have shapes tilted in such directions that a separation distance between the holes decreases toward the front end surface of the block in the moving direction of the moving body.

An optical sensor according to a sixth aspect of the invention to solve the above problem is the optical sensor according to the fifth aspect of the invention, characterized in that the first light receiving hole and the second light receiving hole cross on the front end surface of the block.

An optical sensor according to a seventh aspect of the invention to solve the above problem is the optical sensor according to the fifth aspect of the invention, characterized in that the illumination hole is arranged separately from the first light receiving hole and the second light receiving hole.

An optical sensor according to an eighth aspect of the invention to solve the above problem is the optical sensor according to the seventh aspect of the invention, characterized in that the illumination holes are radially arranged around the first light receiving hole and the second light receiving hole.

An optical sensor according to a ninth aspect of the invention to solve the above problem is the optical sensor according to the fifth aspect of the invention, characterized in that the illumination holes are formed in a shape tapered toward an opposite side to the front end surface of the block.

An optical sensor according to a tenth aspect of the invention to solve the above problem is the optical sensor according to the first aspect of the invention, characterized in that an environment resistant window is provided on the end surfaces of the optical fibers.

An rotating machine according to an eleventh aspect of the invention to solve the above problem is characterized in that the rotating machine includes a rotating body which is arranged in a housing with a clearance provided between the rotating body and an inner peripheral surface of the housing, and the optical sensor according to claim 1 is provided such that a front end of the optical sensor is arranged on the inner peripheral surface of the housing to face a peripheral surface of the rotating body.

Effect of the Invention

The optical sensor and the rotating machine according to the present invention can compensate for effects of thermal expansion and accurately measure the clearance.

BRIEF DESCRIPTION OF THE DRAWINGS

FIG. 3 is a schematic view illustrating a state where illumination light from the optical sensor according to Embodiment 1 of the present invention is lighted up on a rotating body.

FIGS. 8A-8B includes schematic views of a portion around a sensor head in a conventional optical sensor. Part (a) is a sensor axial cross-sectional view and part (b) is a view along the line C-C in part (a) as viewed in the direction of the arrows.

MODE FOR CARRYING OUT THE INVENTION

Figure 1:
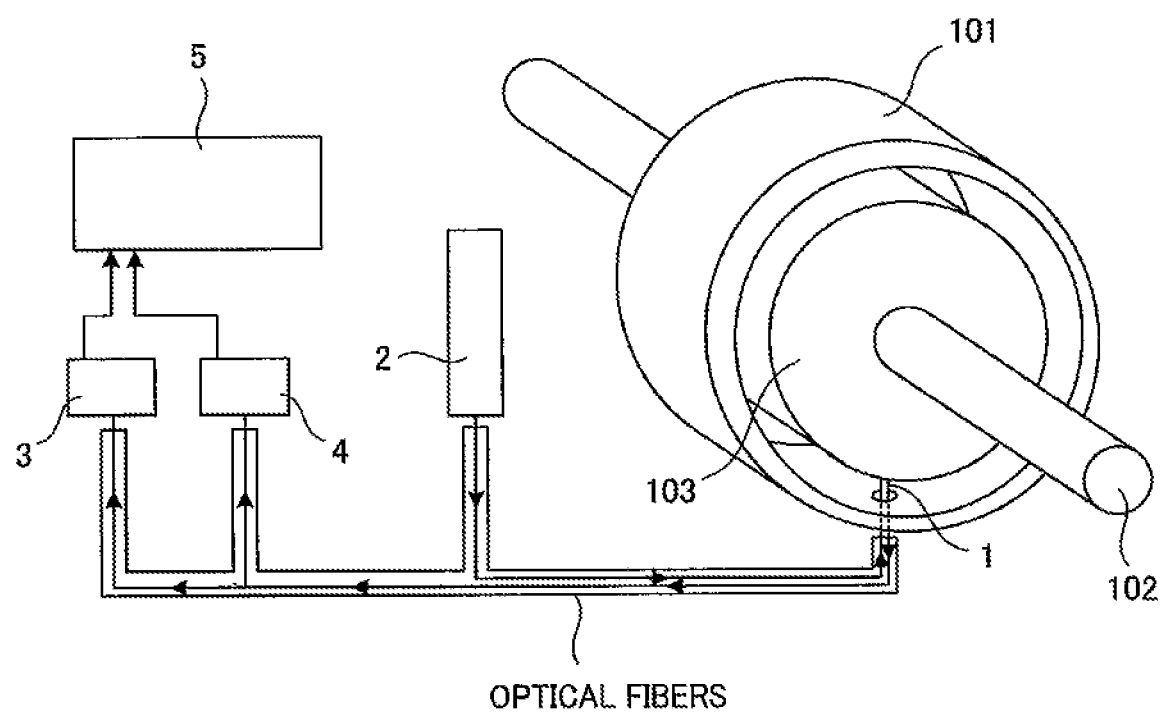
FIG. 1 is a schematic view explaining a rotating machine (including an optical sensor) according to the present invention.

FIG. 1 is a schematic view explaining a rotating machine according to the present invention. As illustrated in FIG. 1, the rotating machine according to the present invention includes a rotating body 103 which is disposed in a housing 101 to be fixed to a rotary shaft 102 with a clearance provided between the rotating body 103 and an inner peripheral surface of the housing 101. Moreover, the rotating machine is provided with an optical sensor whose front end is arranged on the inner peripheral surface of the housing 101 to face a peripheral surface of the rotating body 103.

In detail, the optical sensor according to the present invention includes a sensor unit 1 arranged on the inner peripheral surface of the housing 101 such that its front end surface faces the rotating body 103 to be measured, a light emitting unit 2 connected to the sensor unit 1 via first optical fibers, a first light receiving unit 3 connected to the sensor unit 1 via a second optical fiber, a second light receiving unit 4 connected to the sensor unit 1 via a third optical fiber, a measuring unit 5 connected to the first light receiving unit 3 and the second light receiving unit 4.

In steps of measurement, first, illumination light is outputted from the light emitting unit 2 to the sensor unit 1 via the first optical fibers during drive of the rotating machine and is emitted from a front end portion (sensor head) of the sensor unit 1 toward the rotating body 103.

The illumination light is reflected on the peripheral surface of the rotating body 103 and part of the reflected light enters the sensor head and is inputted into the first light receiving unit 3 via the second optical fiber and into the second light receiving unit 4 via the third optical fiber.

In this case, the reflected light entering the sensor head from the rotating body 103 has a predetermined intensity frequency depending on a shape or a pattern which changes in a circumferential direction (rotating direction) on the peripheral surface of the rotating body 103. For example, when the rotating body 103 is a turbine, this "shape" is a shape of blades. Moreover, the "pattern" is, for example, a pattern of dark and bright portions provided by attaching markers or the like when there is no shape changing in the circumferential direction on the peripheral surface of the rotating body 103.

A measuring unit 5 measures a clearance between the housing 101 and the rotating body 103 based on a timing of the reflected light inputted into each of the first light receiving unit 3 and the second light receiving unit 4.

These are the steps of measurement using the optical sensor provided in the rotating machine according to the present invention.

Embodiments of the optical sensor according to the present invention are described below in detail. Note that, in the following embodiment, the optical sensor is described to be disposed in a turbine in some cases. However, the present invention is not limited to this and can be applied to rotating machines in general.

Moreover, the optical sensor according to the present invention can measure the clearance of not only the rotating body of the rotating machine but also any moving body based on principles (FIGS. 4 and 9 described below and the like) described in the following embodiments.

Embodiment 1

FIG. 8 includes schematic views of a portion around a sensor head in a conventional optical sensor, part (a) of FIG. 8 is a sensor axial cross-sectional view (view along a cross section parallel to a radial cross section of the rotating body 103 (see FIG. 1)), and part (b) of FIG. 8 is a view along the line C-C in part (a) of FIG. 8 as viewed in the direction of the arrows.

In the conventional optical sensor (optical sensor 30), a front end surface 31a of a sensor head 31 faces the peripheral surface of the rotating body 103 and the optical sensor 30 includes illuminating optical fibers 32 (first optical fibers), first light receiving optical fibers 33 (second optical fibers), and second light receiving optical fibers 34 (third optical fibers).

One ends of the illuminating optical fibers 32 are connected to the light emitting unit 2 (see FIG. 1) and end surfaces 32a at the other ends of the illuminating optical fibers 32 are exposed on the front end surface 31a. The illuminating optical fibers 32 are optical fibers serving as transmission routes which emit the illumination light outputted from the light emitting unit 2, from the end surfaces 32a toward the peripheral surface of the rotating body 103.

One ends of the first light receiving optical fibers 33 are connected to the first light receiving unit 3 (see FIG. 1) and end surfaces 33a at the other ends of the first light receiving optical fibers 33 are exposed on the front end surface 31a. The first light receiving optical fibers 33 are optical fibers serving as transmission routes which receive reflected light, being the illumination light reflected on the peripheral surface of the rotating body 103, at the end surfaces 33a and input the reflected light into the first light receiving unit 3.

One ends of the second light receiving optical fibers 34 are connected to the second light receiving unit 4 (see FIG. 1) and end surfaces 34a at the other ends of the second light receiving optical fibers 34 are exposed on the front end surface 31a. The second light receiving optical fibers 34 are optical fibers serving as transmission routes which receive the reflected light, being the illumination light reflected on the peripheral surface of the rotating body 103, at the end surfaces 34a and input the reflected light into the second light receiving unit 4.

Moreover, the first light receiving optical fibers 33 and one of the illuminating optical fibers 32 are grouped into one set referred to as optical fiber group X. Meanwhile, the second light receiving optical fibers 34 and the other illuminating optical fiber 32 are grouped into one set referred to as optical fiber group Y.

The optical fiber groups X and Y extend substantially in the axial direction of the optical sensor 30 and, in the sensor head 31, are tilted in a V shape oriented in such a direction that the separation distance between the groups X and Y increases toward the front end surface 31a (in the view along the cross section parallel to the radial cross section of the rotating body 103). Moreover, the optical fiber groups X and Y are arranged such that, on the front end surface 31a, the positions and angles of the end surface 32a and the end surfaces 33a are symmetric to the positions and angles of the end surface 32a and the end surfaces 34a, with respect to a sensor axial center line of the optical sensor 30.

The separation distance between the set of the end surface 32a and the end surfaces 33a in the optical fiber group X and the set of the end surface 32a and the end surfaces 34a in the optical fiber group Y on the front end surface 31a (distance between a point A and a point B to be described later) is denoted by L. An intersection of three lines including the sensor axial center line and imaginary straight lines $x_3$, $y_3$ passing perpendicularly through the end surfaces 33a, 34a, respectively, is a reference point $O_3$ of distance measurement. An intersecting angle of $x_3$ and $y_3$ at the reference point $O_3$ of distance measurement is denoted by $\alpha_3$.

Note that, since the first light receiving optical fibers 33 and one of the illuminating optical fibers 32 are grouped into one set and the second light receiving optical fibers 34 and the other illuminating optical fiber 32 are grouped into one set, the angles and separation distance of the end surfaces 33a, 34a of the first light receiving optical fibers 33 and the second light receiving optical fibers 34 are equal to the angles and emission intervals of two beams of the illumination light (illumination light propagating through the illuminating optical fibers 32 and outputted toward the rotating body 103).

The configuration of the optical sensor 30 has been described above. Note that steps of clearance measurement using the optical sensor 30 are the same as those described by using FIG. 1. In such an optical sensor, thermal expansion occurs in the front end surface 31a under a high-temperature high-pressure vapor environment. In parts (a) and (b) of FIG. 8, the aforementioned separation distance in this case is denoted by L'. Effects of the thermal expansion on a clearance measurement value are discussed.

Figure 9:
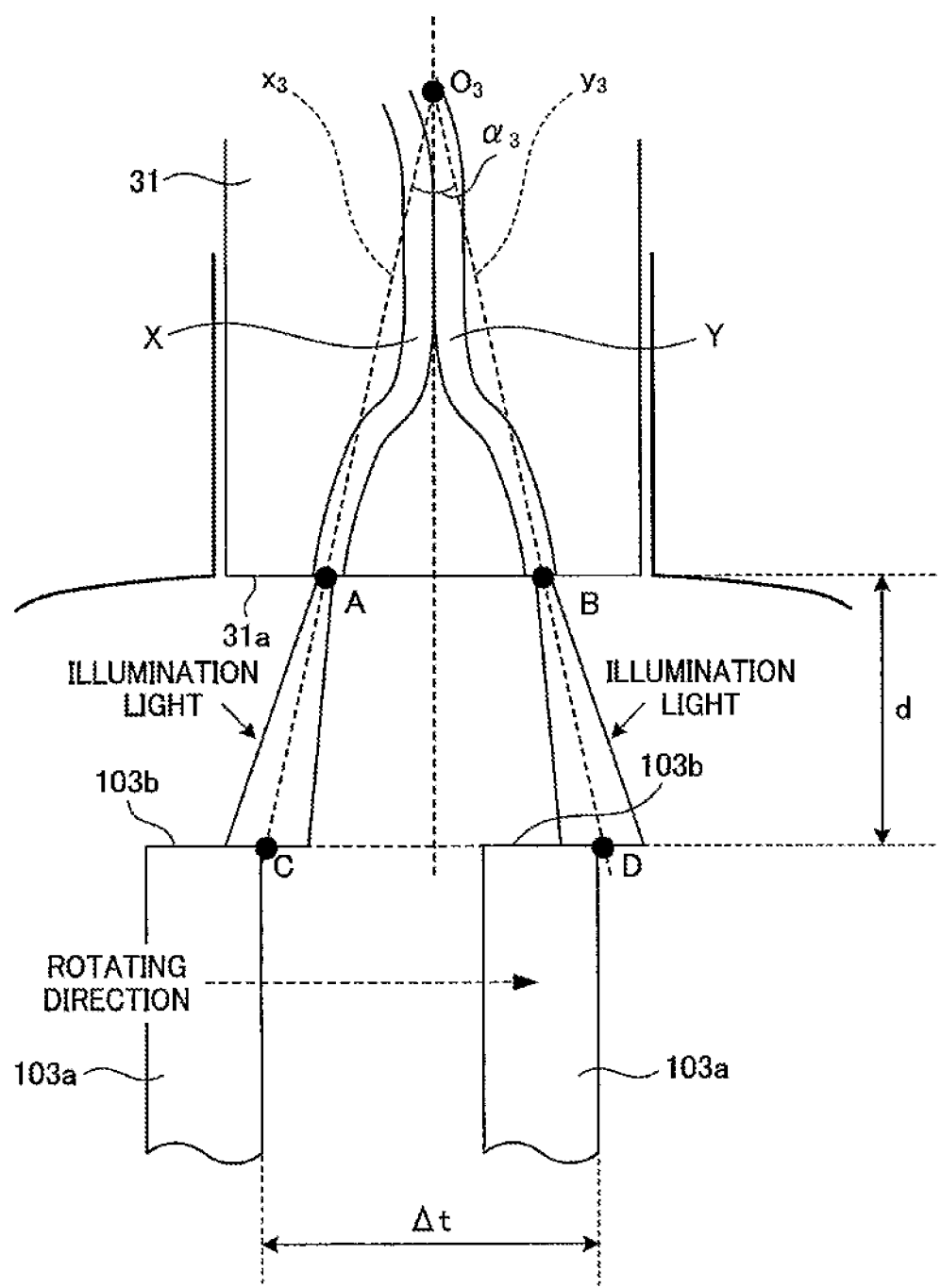
FIG. 9 is a schematic view explaining effects of thermal expansion of the conventional optical sensor on a clearance (tip clearance) measurement value in, for example, a turbine.

FIG. 9 is a schematic view explaining the effects of the thermal expansion of the optical sensor 30 on the clearance (tip clearance) measurement value in, for example, a turbine. As illustrated in FIG. 9, first, the positions of the end surfaces 32a, 33a in the optical fiber group X on the front end surface 31a are referred to as point A (the positions of the multiple optical fibers are grouped to be assumed as one point) and the positions of the end surfaces 32a, 34a in the optical fiber group Y are referred to as point B (similarly assumed as one point).

Moreover, a point where a corner portion (front corner portion in the rotating direction out of two corner portions) of an outer end surface 103b of a blade 103a intersects the imaginary straight line $x_3$ is referred to as point C and a point where the corner portion intersects the imaginary straight line $y_3$ is referred to as point D. Note that this corner portion is a portion where the intensity of the reflected light entering the first light receiving optical fibers 33 and the second light receiving optical fibers 34 (abruptly) changes.

Moreover, time the blade 103a takes to move from the point C to the point D is denoted by Δt and the clearance between the front end surface 31a of the optical sensor 30 and the outer end surface 103b of the blade 103a is denoted by d.

In this case, the following formula (1) is established:

[Math 1]

$$d = \frac{\frac{1}{2}\overline{CD}}{\tan\frac{\alpha}{2}} - \frac{\frac{1}{2}\overline{AB}}{\tan\frac{\alpha}{2}} = \frac{\frac{1}{2} \times 2\pi R \times \frac{\Delta t}{T}}{\tan\frac{\alpha}{2}} - \frac{\frac{1}{2}L}{\tan\frac{\alpha}{2}} \qquad (1)$$

where α is $\alpha_3$ in this case, R is the radius of the rotating body, and T is the frequency of the rotating body.

Specifically, in the optical sensor 30, the measurement value of the clearance d calculated from the aforementioned formula (1) changes due to a change in the aforementioned separation distance from L to L' due to thermal expansion as illustrated in part (a) of FIG. 8. Accordingly, in the embodiment, the aforementioned separation distance is set to zero to eliminate the effects on the measurement value of the clearance d.

Figure 2A:
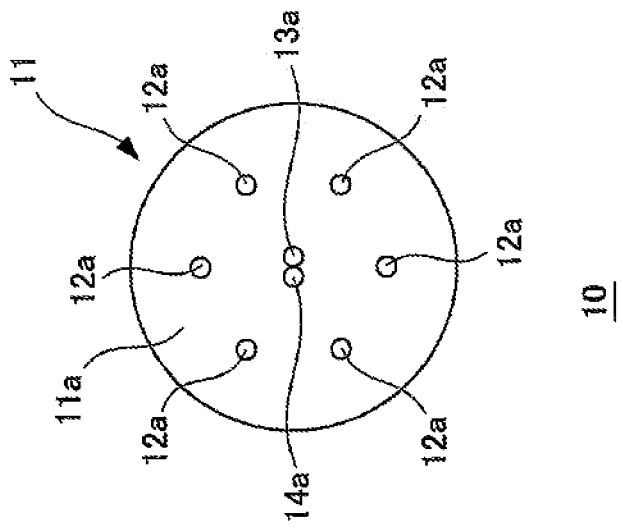
FIGS. 2A-2B includes schematic views of a portion around a sensor head in an example of an optical sensor according to Embodiment 1 of the present invention. Part (a) is a sensor axial cross-sectional view and part (b) is a view along the line A-A in part (a) as viewed in the direction of the arrows.
Figure 2B:
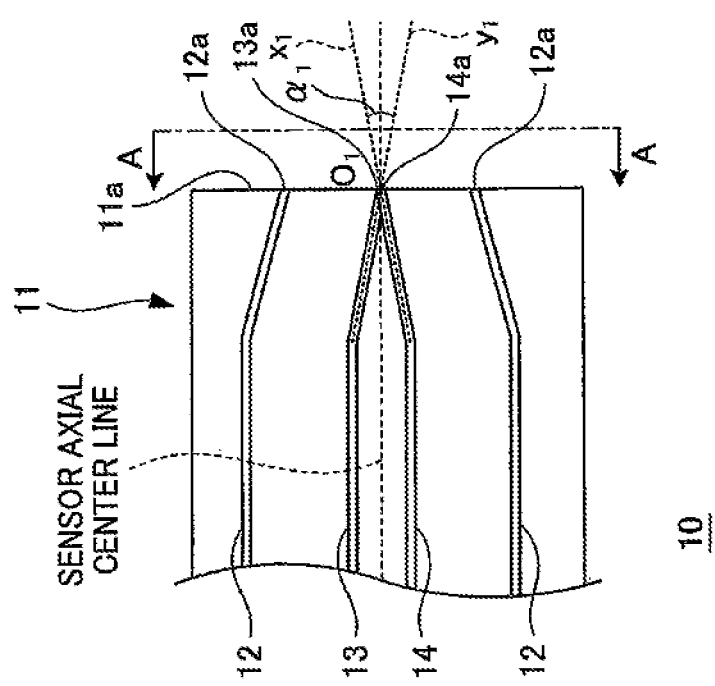

FIG. 2 includes schematic views of a portion around a sensor head in an optical sensor according to the embodiment, part (a) of FIG. 2 is a sensor axial cross-sectional view (that is a view along a cross section parallel to the radial cross section of the rotating body 103 (see FIG. 1)), and part (b) of FIG. 2 is a view along the line A-A in part (a) of FIG. 2 as viewed in the direction of the arrows. Moreover, FIG. 3 is a schematic view illustrating a state where the illumination light from the optical sensor according to the embodiment is lighted up on the rotating body 103.

In the optical sensor (optical sensor 10) according to the embodiment, a front end surface 11a of a sensor head 11 faces the peripheral surface of the rotating body 103 and the optical sensor 10 includes illuminating optical fibers 12 (first optical fibers), a first light receiving optical fiber 13 (second optical fiber), and a second light receiving optical fiber 14 (third optical fiber).

One ends of the illuminating optical fibers 12 are connected to the light emitting unit 2 (see FIG. 1) and end surfaces 12a at the other ends of the illuminating optical fibers 12 are exposed on the front end surface 11a. The illuminating optical fibers 12 are optical fibers serving as transmission routes which emit the illumination light outputted from the light emitting unit 2, from the end surfaces 12a toward the peripheral surface of the rotating body 103 as illustrated in FIG. 3.

One end of the first light receiving optical fiber 13 is connected to the first light receiving unit 3 (see FIG. 1) and an end surface 13a at the other end of the first light receiving optical fiber 13 is exposed on the front end surface 11a. The first light receiving optical fiber 13 is an optical fiber serving as a transmission route which receives the reflected light, being the illumination light reflected on the peripheral surface of the rotating body 103, at the end surface 13a and inputs the reflected light into the first light receiving unit 3.

One end of the second light receiving optical fiber 14 is connected to the second light receiving unit 4 (see FIG. 1) and an end surface 14a at the other end of the second light receiving optical fiber 14 is exposed on the front end surface 11a. The second light receiving optical fiber 14 is an optical fiber serving as a transmission route which receives the reflected light, being the illumination light reflected on the peripheral surface of the rotating body 103, at the end surface 14a and inputs the reflected light into the second light receiving unit 4.

Moreover, the end surface 13a of the first light receiving optical fiber 13 and the end surface 14a of the second light receiving fiber 14 are arranged adjacent to each other in a center portion of the front end surface 11a. As illustrated in part (b) of FIG. 2, the end surfaces 12a of the illuminating optical fibers 12 are radially arranged around the end surface 13a of the first light receiving optical fiber 13 and the end surface 14a of the second light receiving optical fiber 14 to be separate from the end surface 13a of the first light receiving optical fiber 13 and the end surface 14a of the second light receiving optical fiber 14 on the front end surface 11a.

Note that parts (a) and (b) of FIG. 2 illustrate a state where one first light receiving optical fiber 13, one second light receiving optical fiber 14, and six illuminating optical fibers 12 are arranged. However, the embodiment is not limited to this configuration and multiple first light receiving optical fibers 13 and multiple second light receiving optical fibers 14 may be provided and the number of the illuminating optical fibers 12 may be increased or decreased.

The first light receiving optical fiber 13 and the second light receiving optical fiber 14 extend substantially in the axial direction of the optical sensor 10 and, in the sensor head 11, are tilted in a V shape oriented in such a direction that the separation distance between the fibers 13, 14 decreases toward the front end surface 11a (in a view along a cross section parallel to the radial cross section of the rotating body 103) and becomes zero on the front end surface 11a.

Moreover, as illustrated in part (a) of FIG. 2, the first light receiving optical fiber 13 and the second light receiving optical fiber 14 are arranged such that the angles of the end surfaces 13a, 14a on the front end surface 11a are symmetric to each other with respect to a sensor axial center line of the optical sensor 10.

Note that the first light receiving optical fiber 13 and the second light receiving optical fiber 14 do not have to be arranged in a V shape. It is only necessary that the fibers 13, 14 are arranged such that the separation distance between the end surfaces 13a, 14a is zero on the front end surface 11a of the sensor head 11 and the fibers 13, 14 are tilted symmetrically with respect to the sensor axial center line, in the view along the cross-section parallel to the radial cross-section of the rotating body 103.

The configuration of the optical sensor 10 has been described above. Note that steps of clearance measurement using the optical sensor 10 are the same as those described by using FIG. 1. Effects of thermal expansion of the optical sensor 10 on a clearance measurement value are discussed below.

As illustrated in part (a) of FIG. 2, the position of the end surfaces 13a, 14a of the first light receiving optical fiber 13 and the second light receiving optical fiber 14 on the front end surface 11a is set as reference point $O_1$ of distance measurement, imaginary straight lines passing perpendicularly through the end surfaces 13a, 14a are denoted by $x_1, y_1$, respectively, and an intersecting angle of the imaginary straight lines $x_1, y_1$ at the reference point $O_1$ for distance measurement is denoted by $\alpha_1$.

Figure 4:
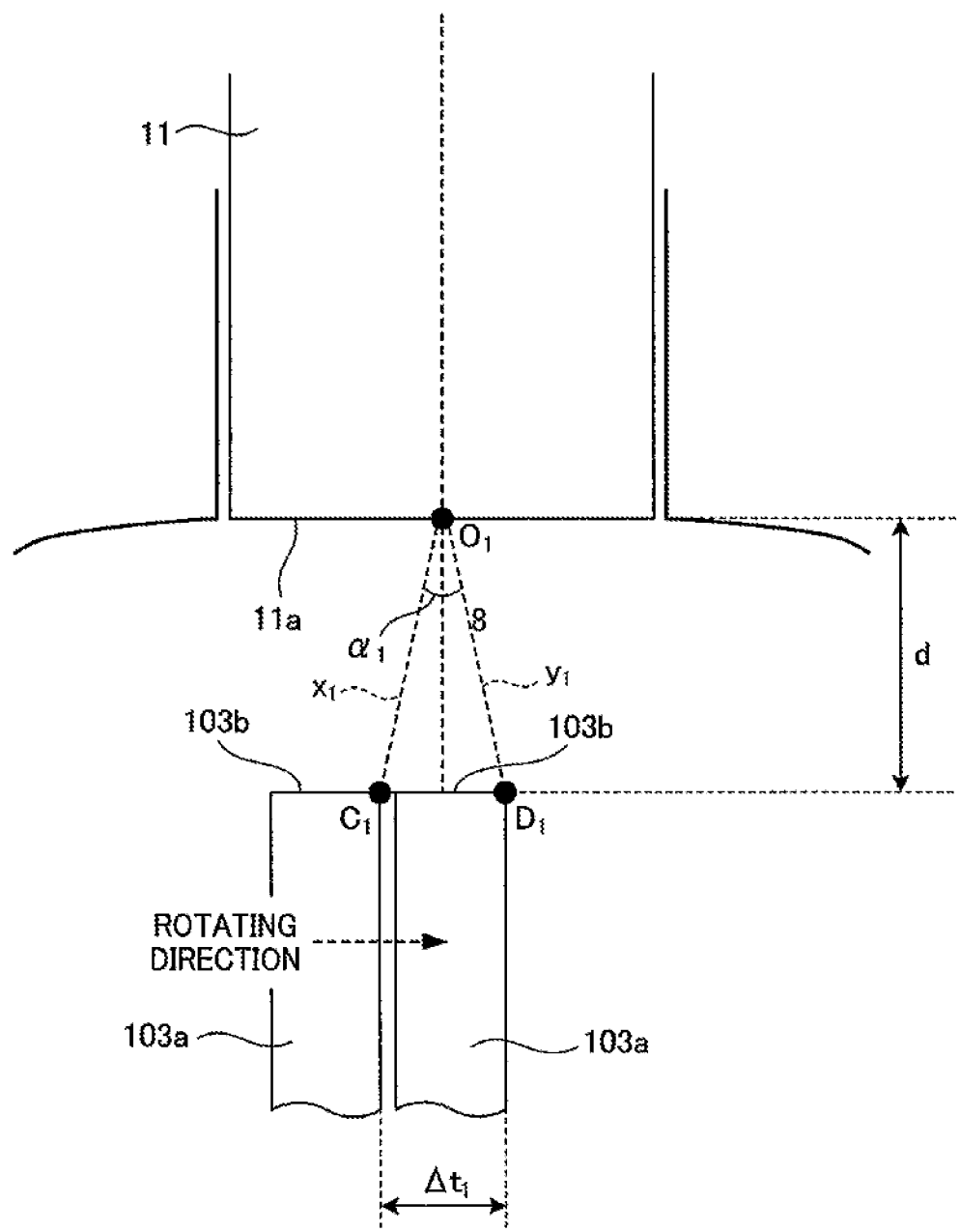
FIG. 4 is a schematic view explaining effects of thermal expansion of the optical sensor according to Embodiment 1 of the present invention on a clearance (tip clearance) measurement value in, for example, a turbine.

FIG. 4 is a schematic view explaining the effects of the thermal expansion of the optical sensor 10 on the clearance (tip clearance) measurement value in, for example, a turbine. As illustrated in FIG. 4, a point where the corner portion (front corner portion in the rotating direction out of two corner portions) of the outer end surface 103b of the blade 103a intersects the imaginary straight line $x_1$ is referred to as point $C_1$ and a point where the corner portion intersects the imaginary straight line $y_1$ is referred to as point $D_1$. Note that this corner portion is a portion where the intensity of the reflected light entering the first light receiving optical fiber 13 and the second light receiving optical fiber 14 (abruptly) changes.

Moreover, time the blade 103a takes to move from the point $C_1$ to the point $D_1$ is denoted by $\Delta t_1$ and the clearance between the front end surface 11a of the optical sensor 10 and the outer end surface 103b of the blade 103a is denoted by d (the same for d in FIG. 3).

Since the separation distance L in the conventional sensor 30 illustrated in part (a) of FIG. 8 is zero in this case, when C, D, $\Delta t$, $\alpha$ are set respectively to $C_1$, $D_1$, $\Delta t_1$, $\alpha_1$ in the aforementioned formula (1), the item "$-(1/2)L/\tan(\alpha_1/2)$" is zero. In the conventional optical sensor 30, the separation distance changes from L to L' by the thermal expansion and the clearance measurement value changes. However, such a problem does not occur in the optical sensor 10 and the measurement accuracy is improved.

Note that environment resistant windows (see FIG. 5 and Embodiment 2 described below) may be provided inside the structure of the sensor head 11 to protect the optical fibers and the like from harsh environments. Moreover, the configuration may be such that fibers with high NA (numerical aperture) are used as the illuminating optical fibers 12 to obtain a large illumination range and fibers with low NA are used as the first light receiving optical fiber 13 and the second light receiving optical fiber 14 to prevent interference therebetween. This further improves the measurement accuracy.

The optical sensor according to the embodiment has been described above. Specifically, in the optical sensor according to the embodiment, the intersection between the reflected light entering the first light receiving optical fiber and the reflected light entering the second light receiving optical fiber (reference point of distance measurement) in the view along the cross section parallel to the radial cross section of the rotating body is set on the front end surface of the sensor head. This can eliminate the effects of the thermal expansion on the clearance measurement value.

Moreover, in the optical sensor according to the embodiment, when optical elements (optical fibers) are opacified or worn by being exposed to harsh environments, a direction in which the reflected light from the rotating body is received is not affected. Accordingly, sensor function variation due to deterioration of the optical elements does not occur.

Moreover, in the optical sensor according to the embodiment, since the end surfaces of the illuminating optical fibers are radially provided on the front end surface of the sensor head, light is emitted in a ring shape and uniform scattering intensity can be secured on the surface of the rotating body. Moreover, since the illuminating optical fibers are provided separately from the light receiving optical fibers, it is possible to prevent interference of the illumination light with the light receiving optical fibers and improve the measurement accuracy by using these configurations.

Embodiment 2

Figure 5:
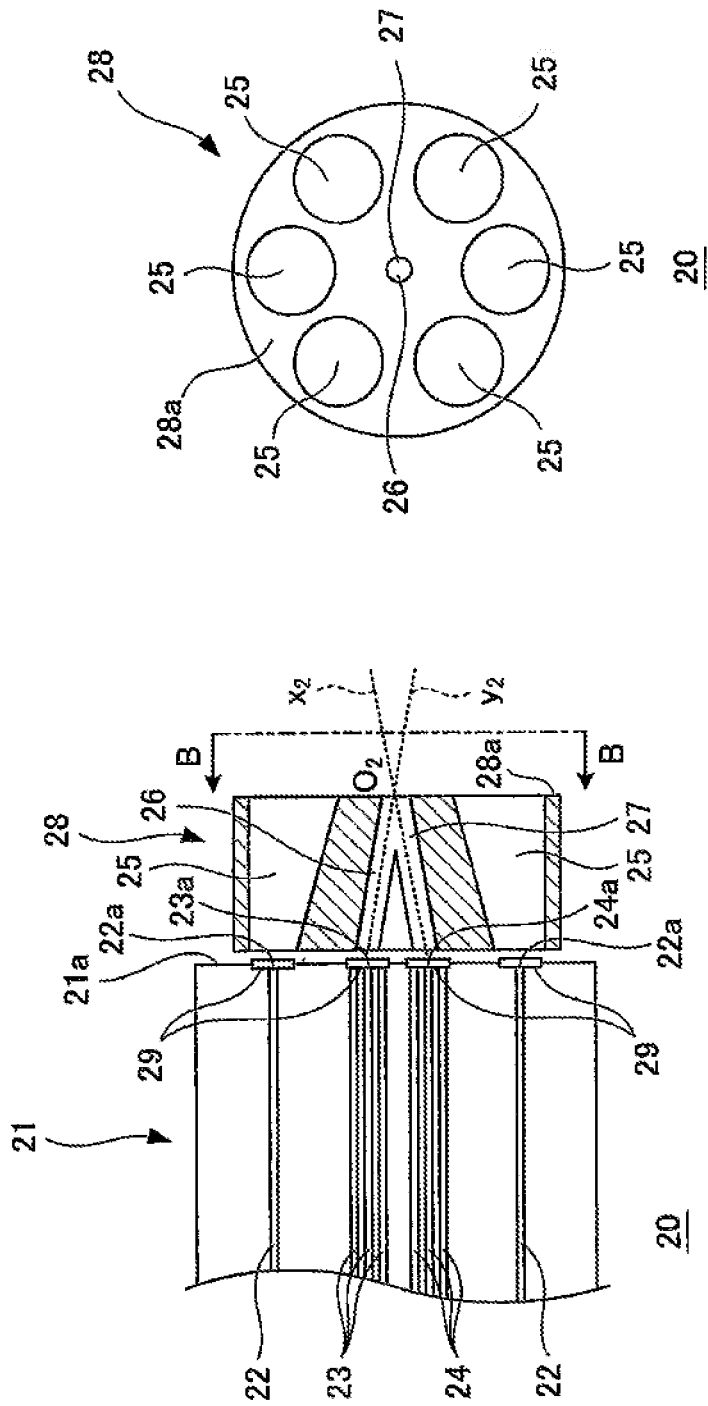
FIGS. 5A-5B includes schematic views of a portion around a sensor head in an optical sensor according to Embodiment 2 of the present invention, part (a) is a sensor axial cross-sectional view, and part (b) is a view along the line B-B in part (a) as viewed in the direction of the arrows.
Figure 6:
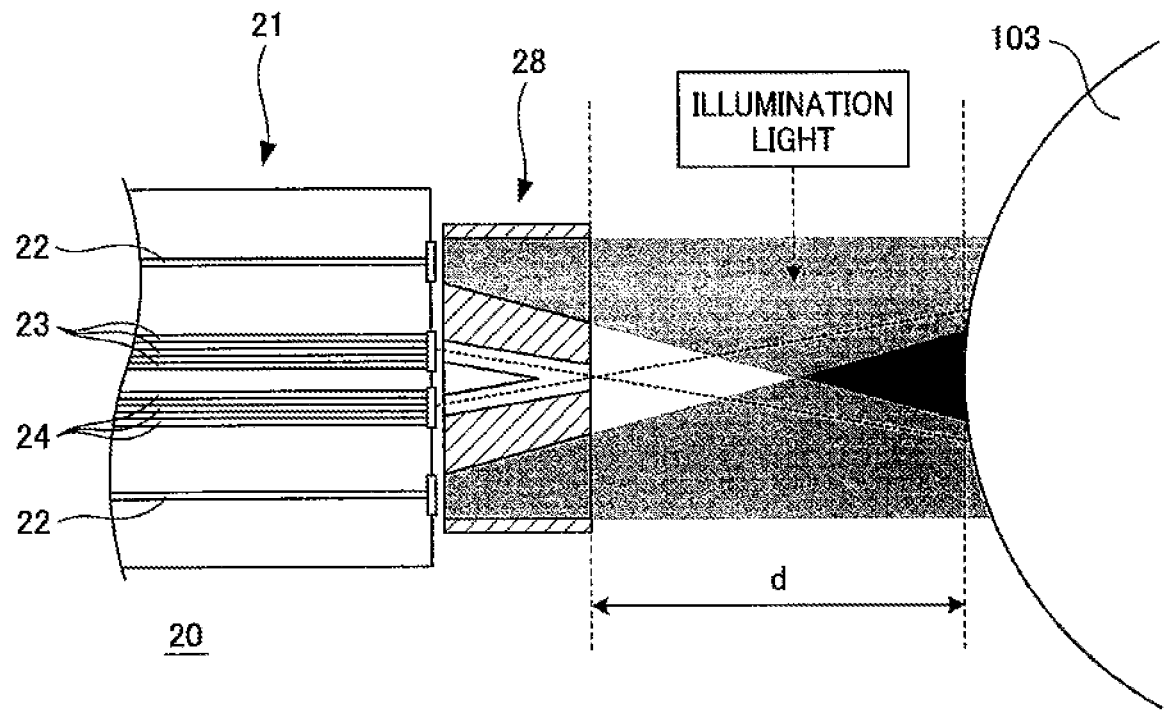
FIG. 6 is a schematic view illustrating a state where illumination light from the optical sensor according to Embodiment 0.2 of the present invention is lighted up on the rotating body.

FIG. 5 includes schematic views of a portion around a sensor head in an optical sensor according to the embodiment, part (a) of FIG. 5 is a sensor axial cross-sectional view (that is a view along a cross section parallel to the radial cross section of the rotating body 103 (see FIG. 1)), and part (b) of FIG. 5 is a view along the line B-B in part (a) of FIG. 5 as viewed in the direction of the arrows. Moreover, FIG. 6 is a schematic view illustrating a state where the illumination light from the optical sensor according to the embodiment is lighted up on the rotating body 103.

In the optical sensor (optical sensor 20) according to the embodiment, a front end surface 21a of a sensor head 21 faces the peripheral surface of the rotating body 103 and the optical sensor 10 includes illuminating optical fibers 22 (first optical fibers), first light receiving optical fibers 23 (second optical fibers), and second light receiving optical fibers 24 (third optical fibers).

One ends of the illuminating optical fibers 22 are connected to the light emitting unit 2 (see FIG. 1) and end surfaces 22a at the other ends of the illuminating optical fibers 22 are exposed on the front end surface 21a. The illuminating optical fibers 22 are optical fibers serving as transmission routes which emit the illumination light outputted from the light emitting unit 2, from the end surfaces 22a toward the peripheral surface of the rotating body 103 as illustrated in FIG. 6.

One ends of the first light receiving optical fibers 23 are connected to the first light receiving unit 3 (see FIG. 1) and end surfaces 23a at the other ends of the first light receiving optical fibers 23 are exposed on the front end surface 21a. The first light receiving optical fibers 23 are optical fibers serving as transmission routes which receive the reflected light, being the illumination light reflected on the peripheral surface of the rotating body 103, at the end surfaces 23a and input the reflected light into the first light receiving unit 3.

One ends of the second light receiving optical fibers 24 are connected to the second light receiving unit 4 (see FIG. 1) and end surfaces 24a at the other ends of the second light receiving optical fibers 24 are exposed on the front end surface 21a. The second light receiving optical fibers 24 are optical fibers serving as transmission routes which receive the reflected light, being the illumination light reflected on the peripheral surface of the rotating body 103, at the end surfaces 24a and input the reflected light into the second light receiving unit 4.

Moreover, the end surfaces 22a, 23a, 24a are arranged separately from one another on the front end surface 21a.

Furthermore, the end surfaces 23a of the first light receiving optical fibers 23 and the end surfaces 24a of the second light receiving optical fibers 24 are arranged in a center portion of the front end surface 21a. The end surfaces 22a of the illuminating optical fibers 22 are radially arranged around the end surfaces 23a of the first light receiving optical fibers 23 and the end surfaces 24a of the second light receiving optical fibers 24 (at least on the front end surface 21a).

Note that parts (a) and (b) of FIG. 5 illustrate a state where multiple first light receiving optical fibers 23, multiple second light receiving optical fibers 24, and six illuminating optical fibers 22 are arranged. However, the embodiment is not limited to this configuration and one first light receiving optical fiber 23 and one second light receiving optical fiber 24 may be provided and the number of the illuminating optical fibers 22 radially arranged may be increased or decreased.

Moreover, the end surfaces 22a, 23a, 24a of the optical fibers may be sealed by environment resistant windows 29. The optical fibers can be thereby protected from harsh environments.

Furthermore, as illustrated in part (a) of FIG. 5, the first light receiving optical fibers 23 and the second light receiving optical fibers 24 are arranged to extend substantially in the axial direction of the optical sensor 20.

A block 28 is provided on the front end surface 21a of the optical sensor 20. Shape change of the block 28 due to heat is isotropic deformation and the block 28 has a structure with a certain thickness in the axial direction. Moreover, a front end surface 28a of the block 28 faces the peripheral surface of the rotating body 103 and illumination holes 25, a first light receiving hole 26, and a second light receiving hole 27 are formed in the block 28.

The first light receiving hole 26 and the second light receiving hole 27 are through holes formed as follows: one ends of the holes 26, 27 are connected to the end surfaces 23a, 24a of the first light receiving optical fibers 23 and the second light receiving optical fibers 24 (via the environment resistant windows 29 in the case where they are provided); and the holes 26, 27 are tilted in a V shape oriented in such a direction that the distance between the holes 26, 27 decreases toward the front end surface 28a (in the view along a cross section parallel to the radial cross section of the rotating body 103) and becomes zero on the front end surface 28a (that is has such a shape that the holes 26, 27 cross at the front end surface 28a).

The illumination holes 25 are through holes whose one ends are connected to the end surfaces 22a of the illuminating optical fibers 22 (via the environment resistant windows 29 in the case where they are provided) and which are formed in a shape tapered toward the opposite side to the front end surface 28a of the block 28 to guide the illumination light from the illuminating optical fibers 22 toward the rotating body 103. Moreover, as illustrated in part (b) of FIG. 5, the illumination holes 25 are radially arranged around the first light receiving hole 26 and the second light receiving hole 27 to be separate from the first light receiving hole 26 and the second light receiving hole 27.

In this configuration, beams of the reflected light entering the first light receiving hole 26 and the second light receiving hole 27, respectively, from the rotating body 103 are separately defined by the first light receiving hole 26 and the second light receiving hole 27.

Note that, in the block 28, a merging portion between the first light receiving hole 26 and the second light receiving hole 27 has a structure to which no stress is applied and deforms axisymmetrically upon receiving heat. This prevents generation of distortion.

The configuration of the optical sensor 20 has been described above. Note that steps of clearance measurement using the optical sensor 20 are the same as those described by using FIG. 1. Effects of thermal expansion of the optical sensor 20 on a clearance measurement value are discussed below.

As illustrated in part (a) of FIG. 5, the position where the first light receiving hole 26 and the second light receiving hole 27 cross on the front end surface 28a is set as reference point $O_2$ of distance measurement, imaginary straight lines passing through the axial centers of the first light receiving hole 26 and the second light receiving hole 27 are denoted by $x_2$, $y_2$, respectively, and an intersecting angle between the imaginary straight lines $x_2$, $y_2$ at the reference point $O_2$ for distance measurement is denoted by $\alpha_2$.

In this case, as in Embodiment 1, the item "−(1/2)L/tan($\alpha_2$/2)" is zero in the aforementioned formula (1) (here, $\alpha$ in the aforementioned formula (1) is set to $\alpha_2$). Accordingly, in the optical sensor 20, the problem of the thermal expansion does not occur and the measurement accuracy is improved.

Figure 7:
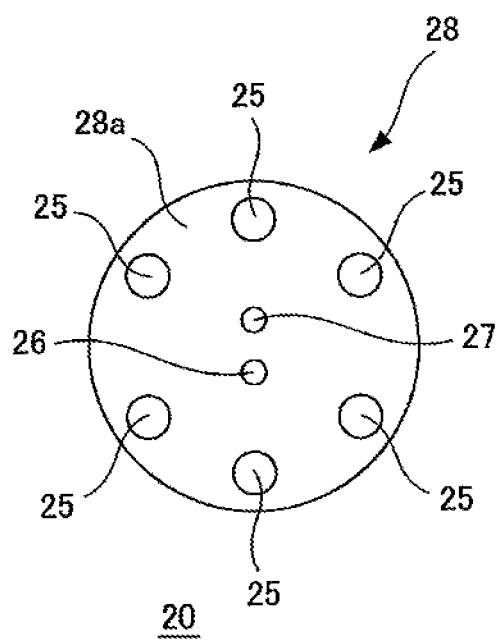
FIG. 7 is a schematic view illustrating a modified example of the optical sensor according to Embodiment 2 of the present invention.

FIG. 7 illustrates a modified example of the optical sensor according to the embodiment. As illustrated in FIG. 7, the first light receiving hole 26 and the second light receiving hole 27 only needs to be formed to be tilted in a V shape oriented in such a direction that the separation distance between the holes 26, 27 decreases toward the front end surface 28a. The holes 26, 27 may be separated from each other by a certain distance such that the separation distance is not zero at the front end surface 28a as described above (that is the shapes are such that the holes 26, 27 do not cross). In this case, the reference point $O_2$ of distance measurement is located closer to the rotating body 103 than the front end surface 28a of the block 28 is.

Note that, as in Embodiment 1, the configuration may be such that fibers with high NA (numerical aperture) are used as the illuminating optical fibers 22 and fibers with low NA are used as the first light receiving optical fibers 23 and the second light receiving optical fibers 24. This further improves the measurement accuracy.

Although the block 28 also thermally expands in the axial direction depending on the material forming the block 28, the expansion is ignorable relative to the measurement accuracy (0.1 mm). Moreover, based on the principle of triangulation, an error due to thermal expansion of the interval (L, L' in FIG. 8) between the end surfaces 13a, 14a of the first and second light receiving optical fibers 13, 14 is greater than the thermal expansion of the block 28.

Since the block 28 isotropically deforms in the merging portion between the first light receiving hole and the second light receiving hole, the incidence angles of the beams reflected light do not change and the first light receiving hole and the second light receiving hole do not interfere with each other.

Moreover, in the optical sensor according to the embodiment, the block 28 also has a role of protecting the optical elements (optical fibers) and the measurement accuracy can be further improved.

The optical sensor according to the embodiment has been described above. Specifically, in the optical sensor according to the embodiment, the block is provided on the front end surface of the sensor head and the intersection between the reflected light entering the first light receiving optical fibers and the reflected light entering the second light receiving optical fibers (reference point of distance measurement) is set closer to the peripheral surface of the rotating body than the front end surface of the sensor head is (set on the front end surface of the block (FIG. 5) or closer to the peripheral surface of the rotating body than the front end surface of the block is (FIG. 7)) in the view along the cross section parallel to the axial cross section of the rotating body. This can eliminate the adverse effects of thermal expansion on the clearance measurement value.

Moreover, in the optical sensor according to the embodiment, when the optical elements (optical fibers) are opacified or worn by being exposed to harsh environments, the direction in which the reflected light from the rotating body is received is not affected. Accordingly, sensor function variation due to deterioration of the optical elements does not occur.

Moreover, in the optical sensor according to the embodiment, since the end surfaces of the illuminating optical fibers are radially provided on the front end surface of the sensor head, light is emitted in a ring shape and uniform scattering intensity can be obtained on the surface of the rotating body. Moreover, since the illuminating optical fibers are provided separately from the light receiving optical fibers, it is possible to prevent interference of the illumination light with the light receiving optical fibers and improve the measurement accuracy by using these configurations.

Although the optical sensor according to the present invention has been described above by using the embodiments, the optical sensor according to the present invention can be used to measure clearances of moving bodies including not only the rotating body but also other moving bodies. In this case, similar results can be obtained by causing the front end surface of the sensor head (and the front end surface of the block) to face the moving body to be measured while arranging the front end surface parallel to the moving direction of the moving body and changing the description "in the view along the cross section parallel to the radial cross section of the rotating body" in the aforementioned embodiments to read "in the moving direction of the moving body."

INDUSTRIAL APPLICABILITY

The present invention is preferable as an optical sensor and a rotating machine including the optical sensor.

REFERENCE SIGNS LIST 1 sensor unit
2 light emitting unit
3 first light receiving unit
4 second light receiving unit
5 measuring unit
10, 20, 30 optical sensor
11, 21, 31 sensor head
11a, 21a, 31a front end surface (of sensor head)
12, 22, 32 illuminating optical fiber
13, 23, 33 first light receiving optical fiber
14, 24, 34 second light receiving optical fiber
12a, 22a, 32a (illuminating optical fiber) end surface
13a, 23a, 33a (first light receiving optical fiber) end surface
14a, 24a, 34a (second light receiving optical fiber) end surface
25 illumination hole
26 first light receiving hole
27 second light receiving hole block
28a front end surface (of block) environment resistant window
101 housing
102 rotary shaft
103 rotating body
103a blade
103b outer end surface

The invention claimed is:

1. An optical sensor which measures a clearance between a front end surface of a sensor head and a measurement target, characterized in that
the optical sensor comprises:
an illuminating optical fiber which emits illumination light from a light emitting unit, from the front end surface of the sensor head toward the measurement target;
a first light receiving optical fiber which receives reflected light at the front end surface of the sensor head and inputs the reflected light into a first light receiving unit, wherein the reflected light is the illumination light reflected on the measurement target;
a second light receiving optical fiber which receives the reflected light at the front end surface of the sensor head and inputs the reflected light into a second light receiving unit; and
a detector which measures the clearance between the measurement target and the sensor head based on a timing at which the reflected light is inputted into each of the first light receiving unit and the second light receiving unit, wherein
an intersection of the reflected light, which is reflected on the measurement target and entering the first light receiving optical fiber, and the reflected light, which is reflected on the measurement target and entering the second light receiving optical fiber, is located on the front end surface of the sensor head,
wherein the first light receiving optical fiber and the second light receiving optical fiber are tilted in such directions that a separation distance between the first light receiving optical fiber and the second light receiving optical fiber decreases toward the measurement target.

2. The optical sensor according to claim 1, wherein on the front end surface of the sensor head,
a separation distance between an end surface of the first light receiving optical fiber and an end surface of the second light receiving optical fiber is zero, and
the end surface of the first light receiving optical fiber and the end surface of the second light receiving optical fiber are arranged to be tilted symmetrically with respect to a sensor axial center line.

3. The optical sensor according to claim 2, wherein an end surface of the illuminating optical fiber is arranged separately from an end surface of the first light receiving optical fiber and an end surface of the second light receiving optical fiber on the front end surface of the sensor head.

4. The optical sensor according to claim 3, wherein an end surface of the illuminating optical fiber is radially arranged around an end surface of the first light receiving optical fiber and an end surface of the second light receiving optical fiber on the front end surface of the sensor head.

5. The optical sensor according to claim 1, wherein an environment resistant window is provided on end surfaces of the optical fibers.

6. A rotating machine wherein
the measurement target is a rotating body,
the rotating body is arranged in a housing with a clearance provided between the rotating body and an inner peripheral surface of the housing, and
the optical sensor according to claim 1 is provided such that a front end of the optical sensor is arranged on the inner peripheral surface of the housing to face a peripheral surface of the rotating body.

7. An optical sensor which measures a clearance between a front end surface of a sensor head and a measurement target, characterized in that
the optical sensor comprises:
an illuminating optical fiber which emits illumination light from a light emitting unit, from the front end surface of the sensor head toward the measurement target;
a first light receiving optical fiber which receives reflected light at the front end surface of the sensor head and inputs the reflected light into a first light receiving unit, wherein the reflected light is the illumination light reflected on the measurement target;
a second light receiving optical fiber which receives the reflected light at the front end surface of the sensor head and inputs the reflected light into a second light receiving unit; and a detector which measures the clearance between the measurement target and the sensor head based on a timing at which the reflected light is inputted into each of the first light receiving unit and the second light receiving unit, wherein a block whose shape change due to heat is isotropic deformation is provided on the front end surface of the sensor head, in the block, there are formed an illumination hole which is a through hole connected to an end surface of the illuminating optical fiber, a first light receiving hole which is a through hole connected to an end surface of the first light receiving optical fiber, and a second light receiving hole which is a through hole connected to an end surface of the second light receiving optical fiber, and the first light receiving hole and the second light receiving hole have shapes tilted in such directions that a separation distance between the holes decreases toward the measurement target.

8. The optical sensor according to claim 7, wherein the first light receiving hole and the second light receiving hole cross on the front end surface of the block.

9. The optical sensor according to claim 7, wherein the illumination hole is arranged separately from the first light receiving hole and the second light receiving hole.

10. The optical sensor according to claim 9, wherein the illumination holes are radially arranged around the first light receiving hole and the second light receiving hole.

11. The optical sensor according to claim 7, wherein the illumination holes are formed in a shape tapered toward an opposite side to the front end surface of the block.

* * * * *